(12) United States Patent
Lin

(10) Patent No.: US 6,830,088 B2
(45) Date of Patent: Dec. 14, 2004

(54) HOT LAMINATING APPARATUS HAVING HEAT SHIELD

(75) Inventor: Shin-Fu Lin, Taipei (TW)

(73) Assignee: Primax Electronics Ltd. (TW)

( * ) Notice: Subject to any disclaimer, the term of this patent is extended or adjusted under 35 U.S.C. 154(b) by 0 days.

(21) Appl. No.: 10/643,423

(22) Filed: Aug. 19, 2003

(65) Prior Publication Data

US 2004/0040669 A1 Mar. 4, 2004

(30) Foreign Application Priority Data

Aug. 27, 2002 (TW) ........................................ 91119463 A

(51) Int. Cl.[7] .............................................. B30B 15/34
(52) U.S. Cl. ..................... 156/555; 156/582; 156/583.1
(58) Field of Search ................... 156/359, 499, 156/555, 582, 583.1; 100/327, 334, 155 R, 160, 176

(56) References Cited

FOREIGN PATENT DOCUMENTS

| CN | 2315010 | 4/1999 |
|---|---|---|
| TW | 509205 | 8/1989 |
| TW | 540960 | 8/1991 |
| TW | 454689 | 9/2001 |

*Primary Examiner*—James Sells
(74) *Attorney, Agent, or Firm*—Madson & Metcalf

(57) ABSTRACT

A hot laminating apparatus for laminating a sheet material and thin films to be hot laminated has heat shield to keep the working temperature thereof. It includes a transmitting and heating roller disposed at one side of a transmission passage of the hot laminating apparatus for heating a thin film in contact therewith and transmitting the sheet material with the thin films through the transmission passage. The hot laminating apparatus further includes a heat shield disposed around the transmitting and heating roller, and covered with a heat-reflective material on an inner surface thereof for reflecting the dissipated thermal energy back to the transmitting and heating roller.

19 Claims, 5 Drawing Sheets

HOT LAMINATING APPARATUS HAVING HEAT SHIELD

FIELD OF THE INVENTION

The present invention relates to a hot laminating apparatus, and more particularly to a hot laminating apparatus having heat shields.

BACKGROUND OF THE INVENTION

Laminating apparatuses are widely used for laminating a sheet between two pieces of plastic films. A conventional laminating apparatus shown in FIG. 1(a) principally comprises two pairs of rollers, i.e. front rollers 10 and rear rollers 11, and a heating unit 12. The front rollers 10 comprise an upper front roller 101 and a lower front roller 102, while the rear rollers 11 comprise an upper rear roller 111 and a lower rear roller 112. The heating unit 12 comprises an upper heating element 121 and a lower heating element 122. The heating unit 12 produces heat from electricity. The process for laminating a sheet material by way of the laminating apparatus is illustrated as follows. The sheet material is sandwiched between a pair of plastic films. The sandwiched structure is then fed to the passage between the upper heating element 121 and the lower heating element 122 by means of the front rollers 10, and the plastic films are heated and thus softened. Then, the sandwiched structure advances and is pressed to be laminated by means of the rear rollers 11 so as to bond the sheet material with the plastic films.

In the above-mentioned laminating apparatus, since the heating mechanism and pressing mechanism are separately performed by two individual units, the materials of the sheet and the plastic films should be limited to some special combinations in view of the heating and laminating timings. In addition, the laminating effect of such laminating apparatus is sometimes not satisfied, for example, due to formation of some bubbles in the resulting article.

In order to overcome the drawbacks, another laminating apparatus as shown in FIG. 1(b) was developed. Such laminating apparatus, also referred as "hot shoe", comprises only a pair of rollers 22. The heat generated by heating plates 21 is uniformly distributed over aluminum extrusion elements 20, and radiated to heat up the rollers 22. Therefore, when the structure including the sheet material sandwiched between a pair of plastic films is fed through the rollers 22, the heating and pressing mechanisms are simultaneously performed thereon so as to avoid the problem of forming bubbles. Since heat for softening the plastic films is transferred from the heating plates 21 to the rollers 22 through air gaps between the aluminum extrusion elements 20 and the rollers 22, a relatively long waiting time, for example 10–15 minutes, is required to warm up the laminating apparatus. Therefore, another laminating apparatus as shown in FIG. 1(c) was developed to solve this problem.

Please refer to FIG. 1(c). The laminating apparatus includes a pair of electro-heaters 30 disposed inside a pair of rollers 31, respectively. The rollers 31 are disposed to form a passage therebetween for passing therethrough the object to be laminated. The rollers 31 wrapping therein the electro-heaters 30 can thus quickly reach the operation temperature due to the direct heat transfer from the inner heaters 30 to the rollers 31. This laminating apparatus has a compact size as well as improved heating efficiency. The heat transferred from the inner heaters 30 to the rollers 31, however, will be dissipated to the whole working environment in the laminating apparatus. Therefore, the heating efficiency of such laminating apparatus is not so satisfied and should be improved further.

Therefore, the purpose of the present invention is to develop a hot laminating apparatus to deal with the above situations encountered in the prior art.

SUMMARY OF THE INVENTION

An object of the present invention is to provide a hot laminating apparatus having heat shields so as to improve the heating efficiency thereof.

According to a first aspect of the present invention, a hot laminating apparatus having a transmission passage for passing therethrough a sheet material and thin films to be hot laminated, includes: a transmitting and heating roller disposed at one side of the transmission passage; and a heat shield disposed adjacent to the transmitting and heating roller. The transmitting and heating roller is used for heating a first thin film in contact therewith and transmitting the sheet material with the thin films through the transmission passage. The heat shield is formed of material including a heat-reflective material and configured to reflect the thermal energy dissipated from the transmitting and heating roller backward to keep its operation temperature.

Preferably, the transmitting and heating roller further includes: a heating shaft for rotating and providing the thermal energy; and a roller element wrapping the heating shaft and being heated with the thermal energy. The roller element is used for heating the first thin film and driven by the heating shaft to rotate so as to transmit the sheet material with the thin films through the transmission passage while pressing the sheet material against the thin films.

Preferably, the hot laminating apparatus further includes another transmitting and heating roller disposed at the other side of the transmission passage; and another heat shield disposed adjacent to the another transmitting and heating roller. They have the same structures of the transmitting and heating roller and the heat shield.

Preferably, the heating shaft is an electro-heater that transforms electric energy into the thermal energy.

Preferably, the roller element is made of rubber.

Preferably, the heat-reflective layer is on a first surface of the heat shield facing the transmitting and heating roller. The heat-reflective material is nickel.

Preferably, the heat shield further includes a heat insulation layer on a second surface thereof opposite to the first surface. For example, the heat insulation layer is a foam rubber layer or an asbestos fiber layer.

According to another aspect of the present invention, a hot laminating apparatus having a transmission passage for passing therethrough a sheet material and a thin film to be hot laminated, includes: a transmitting and heating roller disposed at one side of the transmission passage; and a heat shield. The transmitting and heating roller is used for heating the thin film in contact therewith and transmitting the sheet material with the thin film through the transmission passage. The heat shield includes a main body and a heat-reflective layer formed on the main body for reflecting the thermal energy dissipated from the transmitting and heating roller backward to keep its operation temperature.

According to a further aspect of the present invention, a hot laminating apparatus having a transmission passage for passing therethrough a sheet material and a thin film to be hot laminated, includes: a transmitting and heating roller disposed at one side of the transmission passage; and a heat shield. The transmitting and heating roller is used for heating the thin film in contact therewith and transmitting the sheet material with the thin film through the transmission passage. The heat shield includes a main body and a heat insulation layer formed on the main body for preventing the thermal energy dissipated from the transmitting and heating roller from escaping away from the transmitting and heating roller.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
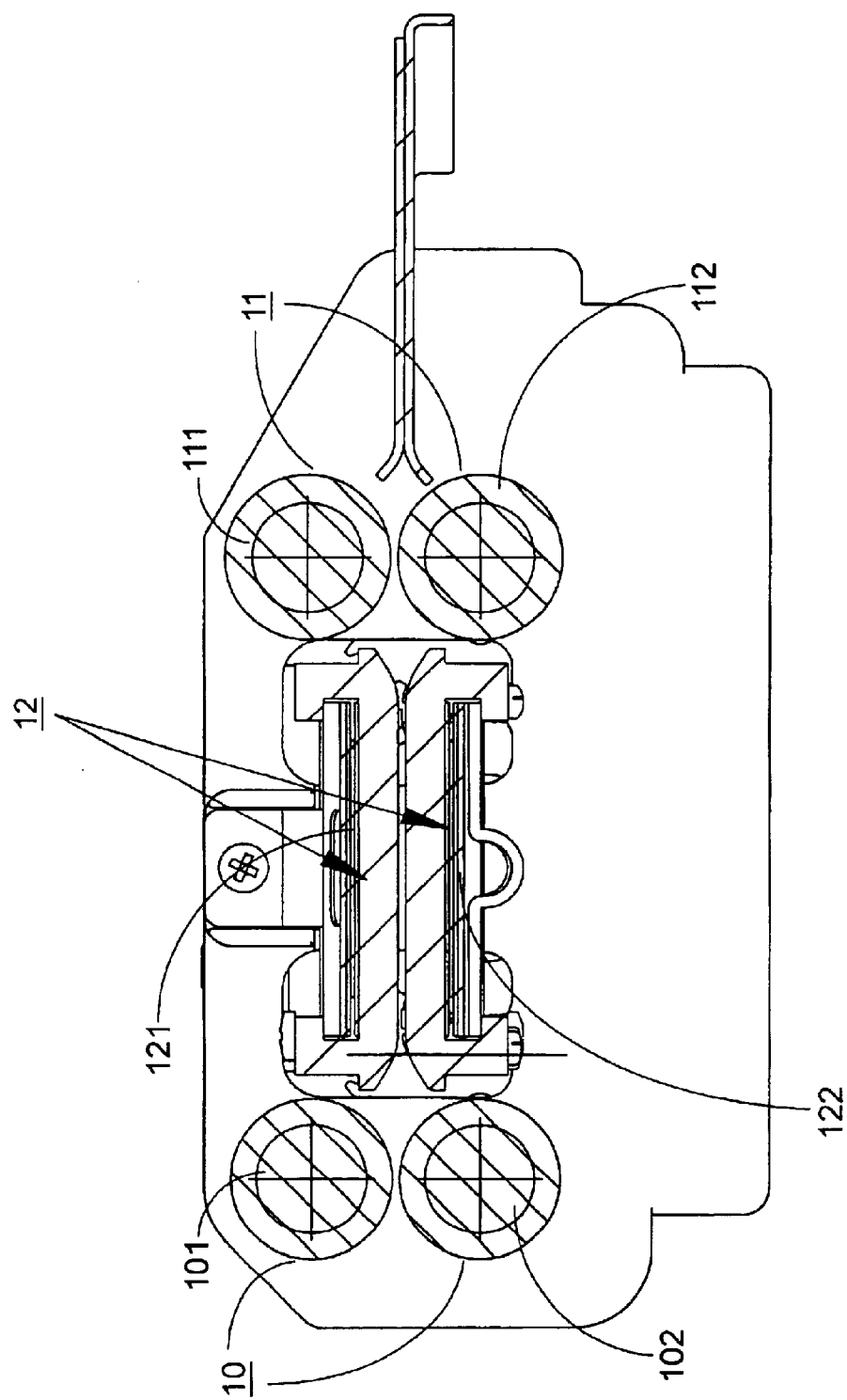
FIG. 1(a) is a cross-sectional view schematically illustrating a first conventional hot laminating apparatus.
Figure 1B:
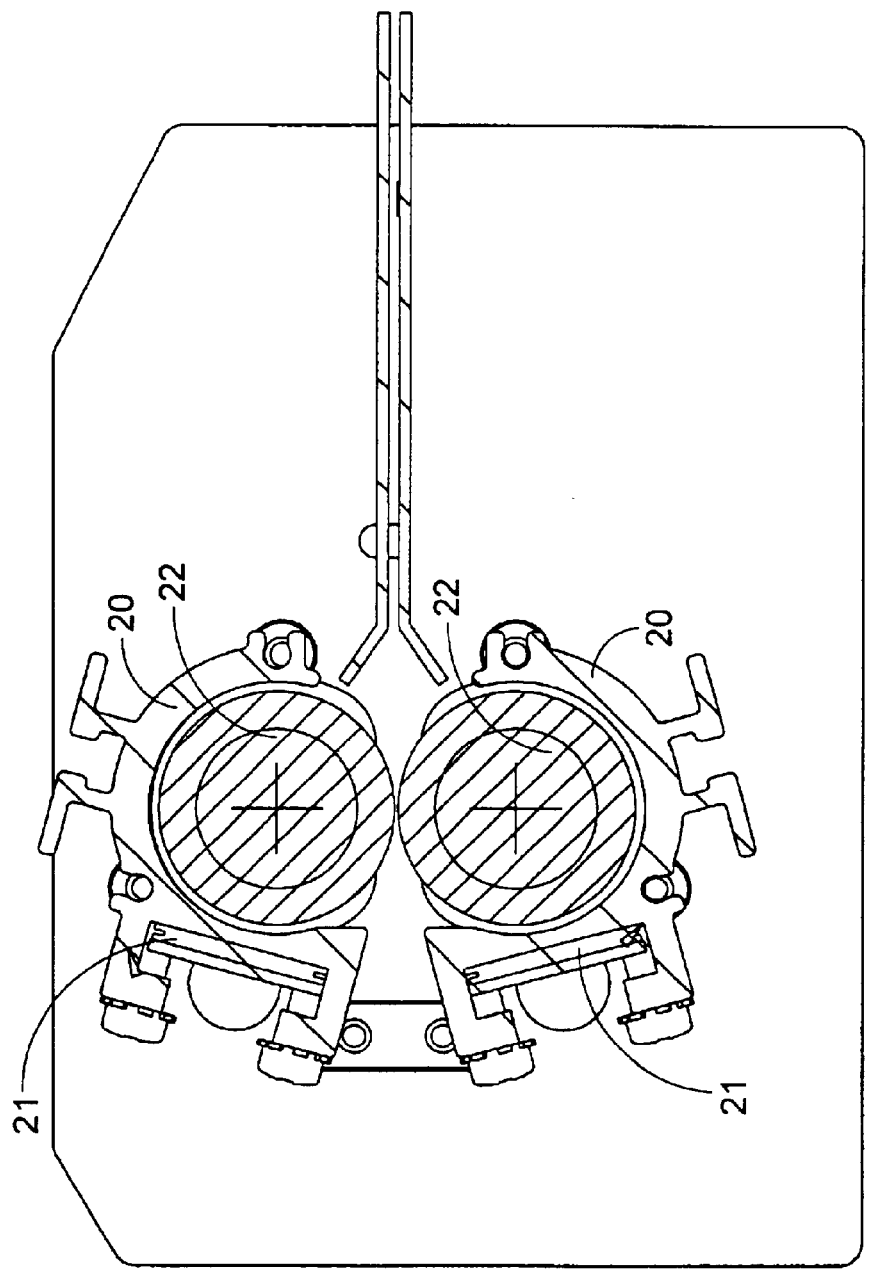
FIG. 1(b) is a cross-sectional view schematically illustrating a second conventional hot laminating apparatus.
Figure 1C:
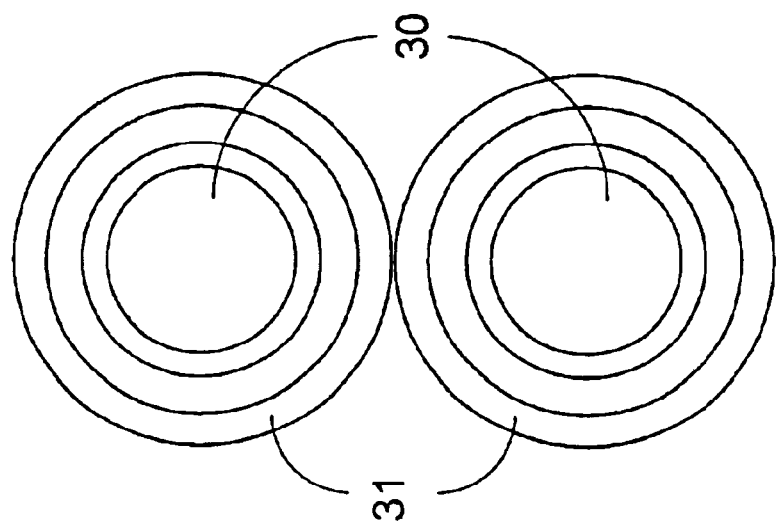
FIG. 1(c) is a cross-sectional view schematically illustrating a third conventional hot laminating apparatus.
Figure 2:
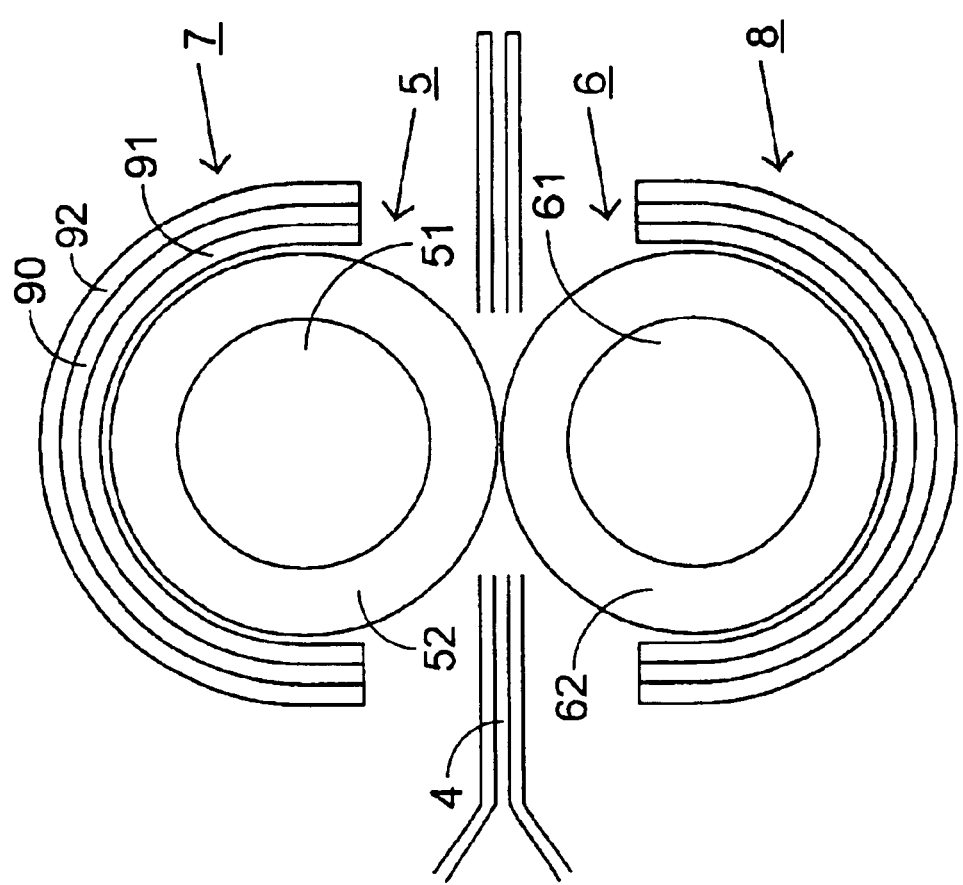
FIG. 2 is a cross-sectional view schematically illustrating a preferred embodiment of a hot laminating apparatus according to the present invention.

Referring to FIG. 2, a preferred embodiment of a hot laminating apparatus according to the present invention is shown. The hot laminating apparatus is used for protecting a sheet material, e.g. paper document or picture, with one or more layers of thin films, e.g. thermoplastic films, by way of lamination. As shown in FIG. 2, the hot laminating apparatus includes a transmission passage 4 for passing therethrough the sheet material and thin films (not shown) to be laminated. An upper transmitting and heating roller 5 and a lower transmitting and heating roller 6 are arranged at two opposite sides of the transmission passage 4. The upper transmitting and heating roller 5 includes a heating shaft 51 and a roller element 52. Similarly, the lower transmitting and heating roller 6 includes another heating shaft 61 and another roller element 62.

In this embodiment, the heating shafts 51 and 61 are electro-heaters which transform electric energy into thermal energy. The heating shafts 51 and 61 are wrapped with the roller elements 61 and 62, respectively. After the electro-heaters 51 and 61 transform electric energy into thermal energy, the thermal energy is conducted to the roller elements 52 and 62 to heat the thin films in contact with the roller elements 52 and 62. The heated portions of the thin films fed into the hot laminating apparatus are thus fused to laminate the corresponding portion of the sheet material therebetween. Meanwhile, the heating shafts 51 and 61 rotate to drive the roller elements 52 and 62. By the clamping action and the rotation of the transmitting and heating rollers 5 and 6, the sheet material and the thin films are transmitted through the transmission passage 4 to be laminated portion by portion. The material of the roller elements 52 and 62 is not specifically limited as long as the heat conduction can be well performed. For example, the roller elements 52 and 62 are made of rubber or other suitable material.

In order to keep the operation temperature on the outer surfaces of the transmitting and heating rollers 5 and 6 at a desired level, two heat shields 7 and 8 are provided around the transmitting and heating rollers 5 and 6. Each of the heat shields 7 and 8 includes a main body 90 and a heat-reflective layer 91 disposed on a surface of the main body 90 facing the transmitting and heating roller 5 or 6. Preferably, the main body 90 is made of metal such as iron, and the heat-reflective layer 91 is made of a heat-reflective material such as nickel. On the opposite surface of the main body 90, a heat insulation material 92 for example made of foam rubber or asbestos fiber is arranged. Therefore, the thermal energy dissipated from the transmitting and heating rollers 5 and 6 can be reflected back to the surfaces of the transmitting and heating rollers 5 and 6 by the heat-reflective layers 91 of the heat shields 7 and 8. At the same time, the heat insulation layer 92 can confine the thermal energy around the surfaces of the transmitting and heating rollers 5 and 6 so as to prevent the thermal energy from escaping away from the transmitting and heating rollers 5 and 6 to the ambient environment. By this way, the operation temperature at the transmitting and heating rollers 5 and 6 is maintained so as to reduce the waste of energy.

Figure 3:
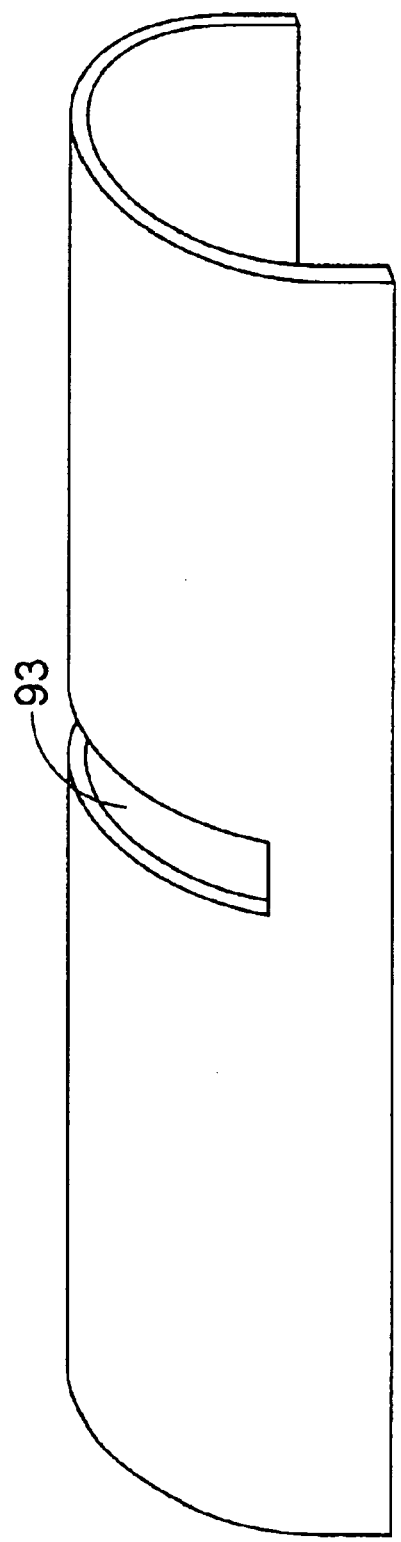
FIG. 3 is a perspective view schematically illustrating a heat shield of a hot laminating apparatus of FIG. 2 according to the present invention.

Please refer to FIG. 3 schematically illustrating a perspective view of a heat shield of the hot laminating apparatus according to the present invention. It is shown that an opening 93 is disposed on the heat shield in addition to the above-mentioned structure. Via the opening 93, a thermo sensor (not shown) can be inserted into the hot laminating apparatus to measure the working temperature. If the temperature measured is too high, a protection mechanism will be started. The heating shafts 51 and 61 are disconnected from the power by a judging element (not shown) to prevent the hot laminating apparatus from being superheated so as to protect the hot laminating apparatus and the inner circuits. The protection mechanism is known technique and no description needs to be further given.

To sum up, one or more heat shields are used in the hot laminating apparatus so as to achieve energy-saving purpose. The materials of the heat shield should not be limited as long as the heat-reflective or heat insulation effects are well performed. By applying the heat shields, the heat efficiency is thus improved.

While the invention has been described in terms of what is presently considered to be the most practical and preferred embodiments, it is to be understood that the invention needs not be limited to the disclosed embodiment. On the contrary, it is intended to shield various modifications and similar arrangements included within the spirit and scope of the appended claims which are to be accorded with the broadest interpretation so as to encompass all such modifications and similar structures.

What is claimed is:

1. A hot laminating apparatus having a transmission passage for passing therethrough a sheet material and thin films to be hot laminated, comprising:

a first transmitting and heating roller disposed at a first side of said transmission passage for heating a first one of said thin films in contact therewith and transmitting said sheet material with said thin films through said transmission passage; and a first heat shield disposed adjacent to said first transmitting and heating roller, formed of material comprising a heat-reflective material and configured to reflect thermal energy dissipated from said first transmitting and heating roller back to said first transmitting and heating roller.

2. The hot laminating apparatus according to claim 1 wherein said first transmitting and heating roller further comprises:
- a first heating shaft for rotating and providing thermal energy; and
- a first roller element wrapping said first heating shaft and being heated with said thermal energy for heating said first one of said thin films, and driven by said first heating shaft to rotate so as to transmit said sheet material with said thin films through said transmission passage while pressing said sheet material against said thin films.

3. The hot laminating apparatus according to claim 2 wherein said first heating shaft is an electro-heater that transforms electric energy into said thermal energy.

4. The hot laminating apparatus according to claim 2 wherein said first roller element is made of rubber.

5. The hot laminating apparatus according to claim 1 wherein said first heat shield is disposed around said first transmitting and heating roller.

6. The hot laminating apparatus according to claim 1 wherein said first heat shield includes a heat-reflective layer made of said heat-reflective material on a first surface thereof facing said first transmitting and heating roller.

7. The hot laminating apparatus according to claim 6 wherein said heat-reflective material is nickel.

8. The hot laminating apparatus according to claim 6 wherein said first heat shield further includes a heat insulation layer made of a heat insulation material and arranged on a second surface thereof opposite to said first surface.

9. The hot laminating apparatus according to claim 8 wherein said heat insulation material is one of foam rubber and asbestos fiber.

10. The hot laminating apparatus according to claim 1 wherein said hot laminating apparatus further comprises:
- a second transmitting and heating roller disposed at a second side of said transmission passage for heating a second one of said thin films in contact therewith and cooperating with said first transmitting and heating roller to transmit said sheet material with said thin films through said transmission passage; and
- a second heat shield disposed adjacent to said second transmitting and heating roller, formed of material comprising a heat-reflective material and configured to reflect thermal energy dissipated from said second transmitting and heating roller back to said second transmitting and heating roller.

11. The hot laminating apparatus according to claim 10 wherein said second heat shield comprises:
- a heat-reflective layer made of said heat-reflective material on a first surface thereof facing said second transmitting and heating roller; and
- a heat insulation layer made of a heat insulation material and arranged on a second surface thereof opposite to said first surface.

12. A hot laminating apparatus having a transmission passage for passing therethrough a sheet material and a thin film to be hot laminated, comprising:
- a transmitting and heating roller disposed at a side of said transmission passage for heating said thin film in contact therewith and transmitting said sheet material with said thin film through said transmission passage; and
- a heat shield comprising:
  - a main body; and
  - a heat-reflective layer formed on said main body for reflecting thermal energy dissipated from said transmitting and heating roller back to said transmitting and heating roller.

13. The hot laminating apparatus according to claim 12 wherein said main body of said heat shield is made of iron.

14. The hot laminating apparatus according to claim 12 wherein said heat shield is disposed around said transmitting and heating roller.

15. The hot laminating apparatus according to claim 14 wherein said heat-reflective layer is a nickel layer on a first surface of said main body facing said transmitting and heating roller.

16. The hot laminating apparatus according to claim 15 wherein said heat shield further comprises a heat insulation layer made of one of foam rubber and asbestos fiber, and arranged on a second surface of said main body opposite to said first surface.

17. A hot laminating apparatus having a transmission passage for passing therethrough a sheet material and a thin film to be hot laminated, comprising:
- a transmitting and heating roller disposed at a side of said transmission passage for heating said thin film in contact therewith and transmitting said sheet material with said thin film through said transmission passage; and
- a heat shield comprising:
  - a main body;
  - a heat insulation layer formed on said main body for preventing thermal energy dissipated from said transmitting and heating roller from escaping away from said transmitting and heating roller; and
  - a heat-reflective layer formed on said main body for reflecting said dissipated thermal energy back to said transmitting and heating roller.

18. The hot laminating apparatus according to claim 17 wherein said main body is made of iron.

19. The hot laminating apparatus according to claim 17 wherein said heat insulation layer is one of a foam rubber layer and an asbestos layer, and said heat-reflective layer is a nickel layer.

* * * * *